Patented Feb. 17, 1931

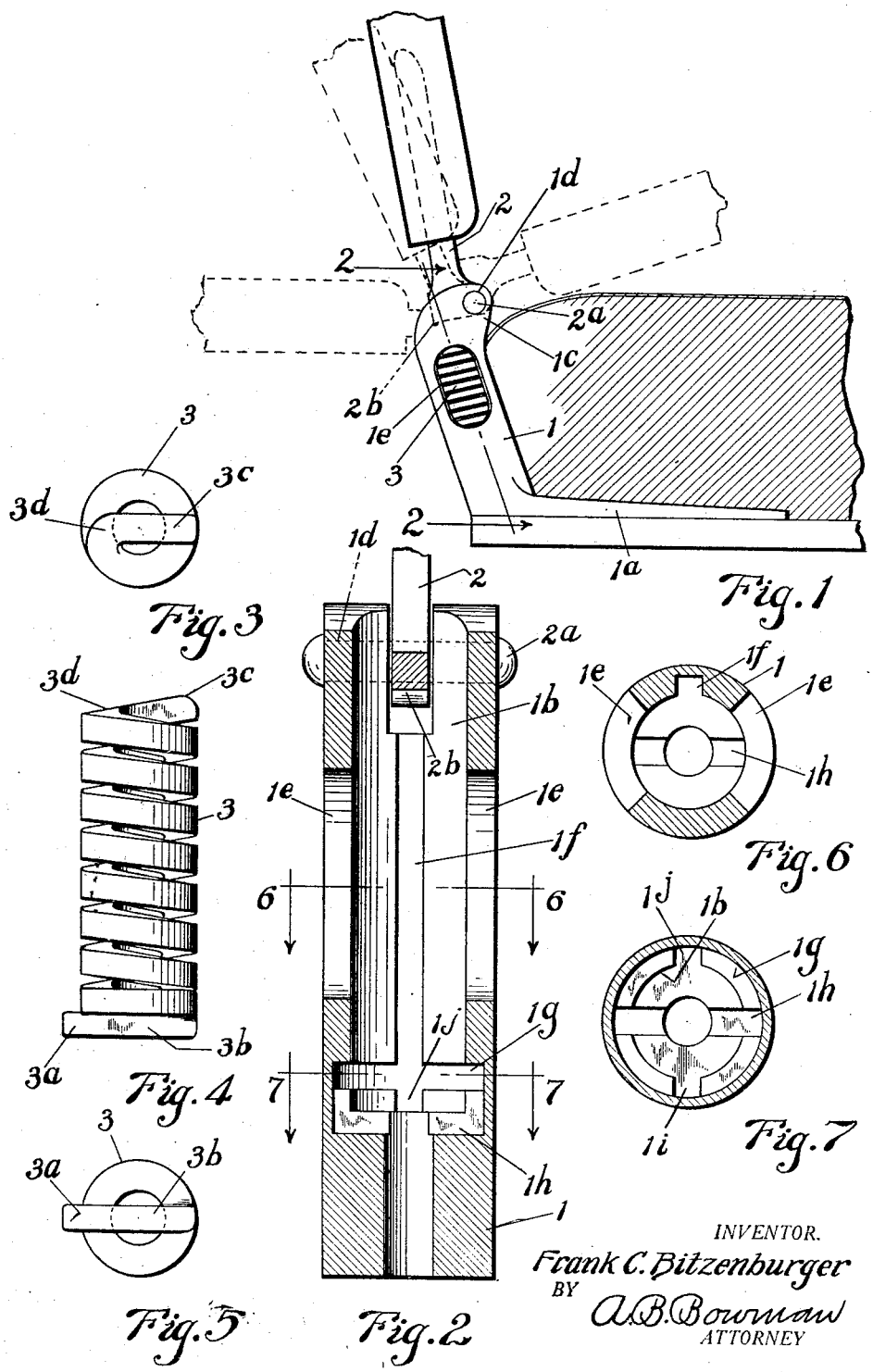

1,793,045

UNITED STATES PATENT OFFICE

FRANK C. BITZENBURGER, OF LOS ANGELES, CALIFORNIA

SEAT-BACK-SUPPORTING APPARATUS

Application filed July 13, 1926. Serial No. 122,068.

My invention relates to back supports for seats, more particularly for automobile seats and the like, and the objects of my invention are:

First, to provide a resilient back support for seats in which the back may be turned down to an approximately horizontal position for a bed; second, to provide a back support for seats of this class which is supported by a spring when serving as a seat back and in which the spring is inoperative when the same is used as a bed; third, to provide a seat back structure of this class which may be tilted forwardly or backwardly and is resiliently supported in several intermediate positions; fourth, to provide a seat back of this class with a positive stop means for holding the seat back in a horizontal position for a bed; fifth, to provide a seat back of this class in which the position of the seat back is adjusted by changing the position of the spring in its support; sixth, to provide a novel seat back supporting structure of this class; and, seventh, to provide a seat back support of this class which is very simple and economical of construction, durable, adjustable, efficient, easily converted from a chair to a bed structure and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my seat back supporting device shown in connection with a seat, and showing by dotted lines varying positions of the seat back; Fig. 2 is a sectional view on an enlarged scale through 2—2 of Fig. 1; Fig. 3 is an upper end view of the spring; Fig. 4, a side elevational view thereof; Fig. 5, a lower end view thereof; Fig. 6 is a sectional view through 6—6 of Fig. 2, and Fig. 7, a sectional view through 7—7 of Fig. 2.

Similar characters of reference refer to similar parts and portions throughout the several views of the drawings.

The supporting member 1, seat back bracket 2 and spring 3 constitute the principal parts of my seat back supporting apparatus.

The supporting member 1 is preferably a cylindrical member provided with an extended angular lug portion 1a which is adapted to secure it to the seat beneath the upholstering, as shown best in Fig. 1 of the drawings. It is provided at its top end and extending to near the bottom end with a bore 1b which is of slightly larger diameter than the diameter of the spring 3 which fits therein. It is provided with a slightly offset portion 1c which is provided with a hole 1d adapted for a pin 2a. This pin is offset sufficiently so that when the seat back is tilted forwardly, as shown by dotted lines in Fig. 1 of the drawings, the spring may be removed, if desired. The portion 1c is slotted of the proper width to provide for the insertion of and pivotal movement of the bracket member 2. The member 1 is provided with openings 1e in its opposite sides adapted to permit the operator to shift the spring upwardly and downwardly and turn the same for adjustment purposes. This member 1 is also provided with a notch in its front side of sufficient depth from the interior surface to provide for the extended end 3a of the spring 3 to be shifted downwardly therein. Near the lower end of the bore 1b is an annular notch 1g which permits this end 3a to be shifted around. It is also provided with a transverse slot 1h adapted for the member 3b to rest in, when turned to a certain position so that the bracket 2 will not engage said spring when turning the bracket backwardly to form a bed, as shown by dotted lines in Fig. 1 of the drawings. It is also provided with notches 1i and 1j for the member 3a to rest in to prevent the spring 3 from turning in this member 1. The upper end of the spring 3, it will be noted, is extended across the end of the spring at the middle, as shown best in Fig. 3 of the drawings, the side 3c being considerably higher than the side 3d. The bracket 2, it will be noted, is pivoted near one side on the pin 2a, thus providing an offset portion 2b which is adapted to rest upon the upper end of the spring dependent upon the position of the spring in the member 1.

The operation of the apparatus is as follows; the spring is placed with the lower end downwardly and inserted into the opening 1b with the portion 3a in the slot 1f, and dropped down to the bottom, in which position the portion 3d at the upper end is at the front, with the bracket set back on to the upper end of the spring, the seat back assuming a relatively forward position, as shown by solid lines in Fig. 1 of the drawings. If it is desired to set the seat back more on a backward incline, the spring is raised until the portion 3a can be turned in the slot 1g one-half revolution and held in said slot, when the portion 3c will be towards the front and the portion 3d toward the rear which will permit the seat back to set further back because the offset portion 2b will engage a lower position on the upper end of the spring. The seat may be tilted forwardly with the spring in any position. When it is desired to tilt the seat back to form a bed, the seat back is tilted forwardly, the spring raised until the member 3a can be turned a quarter revolution in the slot 1g so that the upper end assumes a crosswise position; then the spring is dropped so that the portion 3b is in the slot 1h so that the spring drops down lower, and inasmuch as the cross portions formed of the members 3d and 3c are crosswise, the portion 2b will clear this portion, permitting the seat back to be turned down to a horizontal position to form a bed. The lug 2b then engages the front inner side of the member 1 which forms a positive stop and support for the seat back.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a seat back supporting apparatus, a supporting member, a spring shiftable to various positions therein, a seat back bracket pivotally mounted thereon provided with an offset portion adapted to engage the upper end of said spring when said spring is in certain positions and adapted to be disengaged from the spring when the spring is shifted, and means in connection with said support and said spring for fixedly holding said spring in said various shifted positions.

2. In a seat back supporting apparatus, a supporting member, a spring shiftable to various positions therein, a seat back bracket pivotally mounted thereon provided with an offset portion adapted to engage the upper end of said spring when said spring is in certain positions and adapted to be disengaged from the spring when the spring is shifted, means in connection with said support and said spring for holding said spring in certain shifted positions, and slot means in connection with the support to facilitate the lowering of the spring when the same is shifted to another position whereby it is disengaged from said seat back bracket.

3. In a seat back supporting apparatus, a supporting member, a spring shiftable to various positions therein, a seat back bracket pivotally mounted thereon provided with an offset portion adapted to engage the upper end of said spring when said spring is in certain positions and adapted to be disengaged from the spring when the spring is shifted, and slot means in connection with the support to facilitate the lowering of the spring shifted to certain position whereby it is disengaged from said seat back bracket.

4. In a seat back supporting apparatus, a supporting member, a spring longitudinally and rotatably adjustable therein to different depths within the supporting member, and a seat back bracket pivotally mounted on said supporting member and adapted to engage the upper end of said spring.

5. In a seat back supporting apparatus, a supporting member, a spring mounted therein and rotatably adjustable relative thereto, and multiple guide and positioning means in connection with said supporting member to facilitate said rotatable adjustment and for fixing the position of the spring, and a seat back bracket pivotally mounted on said supporting member and adapted, when the spring is in certain positions, to engage the upper end of said spring.

6. In a seat back supporting apparatus, a supporting member provided with spring seat portions at different elevations, a spring mounted in said supporting member adapted to be held in different positions longitudinally with respect to its axis, and a seat back bracket pivotally mounted on said supporting member adapted, when in certain positions, to engage the upper end of said spring.

7. In a combination back and bed support for seats, a seat, a supporting member mounted adjacent thereto, a back bracket member provided with an offset portion pivotally mounted in said supporting member, and a spring mounted on one of said members and engaging the other member, said spring being longitudinally adjustably mounted on the former and movable to a fixed position thereon out of engagement with the other, said back bracket member being adapted to be folded backwardly to a horizontal position substantially on the level with the seat when the spring is disengaged from one of the members with which it normally engages.

8. In a combination back and bed support for seats, a supporting member, a back bracket member pivotally mounted in said supporting member and adapted to be folded forwardly, an offset portion on one of said members, and a longitudinally adjustable spring mounted on the other of said members and adapted to engage the offset on the former member, said back bracket member, when folded forwardly, forming a clearance for the longitudinal adjustment and also for the removal of said spring from the member in which it is mounted.

In testimony whereof, I have hereunto set my hand at Los Angeles, California, this 7th day of July, 1926.

FRANK C. BITZENBURGER.